(12) United States Patent
Hammerum et al.

(10) Patent No.: US 10,267,291 B2
(45) Date of Patent: Apr. 23, 2019

(54) CONTROL OF A WIND TURBINE WITH A FAULT CONDITION

(71) Applicant: VESTAS WIND SYSTEMS A/S, Aarhus N (DK)

(72) Inventors: Keld Hammerum, Hadsten (DK); Tobias Gybel Hovgaard, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 46 days.

(21) Appl. No.: 15/504,138

(22) PCT Filed: Aug. 14, 2015

(86) PCT No.: PCT/DK2015/050238
§ 371 (c)(1),
(2) Date: Feb. 15, 2017

(87) PCT Pub. No.: WO2016/023560
PCT Pub. Date: Feb. 18, 2016

(65) Prior Publication Data
US 2017/0226989 A1    Aug. 10, 2017

(30) Foreign Application Priority Data
Aug. 15, 2014   (DK) .................................. 2014 70492

(51) Int. Cl.
*F03D 7/02*     (2006.01)
*F03D 7/04*     (2006.01)

(52) U.S. Cl.
CPC ........... *F03D 7/045* (2013.01); *F03D 7/0264* (2013.01); *F05B 2270/107* (2013.01); *F05B 2270/404* (2013.01); *Y02E 10/723* (2013.01)

(58) Field of Classification Search
CPC .. F03D 7/045; F03D 7/0264; F05B 2270/404; F05B 2270/107
USPC ......................................................... 700/267
See application file for complete search history.

(56) References Cited

U.S. PATENT DOCUMENTS

2013/0106107 A1* 5/2013 Spruce ................. F03D 7/0224
290/44

FOREIGN PATENT DOCUMENTS

| EP | 2746576 A2 | 6/2014 |
|---|---|---|
| WO | 2008043762 A1 | 4/2008 |
| WO | 2011035976 A1 | 3/2011 |

OTHER PUBLICATIONS

International Search Report for PCT/DK2015/050238, dated Oct. 22, 2015.

(Continued)

*Primary Examiner* — Ziaul Karim
(74) *Attorney, Agent, or Firm* — Patterson + Sheridan, LLP (57) ABSTRACT

The present invention relates to control of wind turbines in a situation where a fault condition is detected. Control of a wind turbine is described where a control trajectory and a safe-mode trajectory are calculated based on the current operational state of the wind turbine. If the fault condition is detected the wind turbine is controlled using the safe-mode trajectory, otherwise, the normal operation of the wind turbine is continued where the wind turbine is controlled using the control trajectory.

18 Claims, 5 Drawing Sheets

(56) References Cited

OTHER PUBLICATIONS

Danish Search Report for PA 2014 70492, dated Mar. 12, 2015.
Arne Koerber et al: "Combined Feedback Feed Forward Control of Wind Turbines Using State-Constrained Model Predictive Control", IEEE Transactions on Control Systems Technology, IEEE Service Center, New York, NY, US, vol. 21, No. 4, Jul. 1, 2013 (Jul. 1, 2013), pp. 1117-1128.

* cited by examiner

CONTROL OF A WIND TURBINE WITH A FAULT CONDITION

FIELD OF THE INVENTION

The present invention relates to control of wind turbines in a situation where a fault condition is detected.

BACKGROUND OF THE INVENTION

In general, a wind turbine or a wind turbine park is operated with the aim to obtain maximum yield of the capital invested in it, and consequently the wind turbine control systems are configured to maximize the output power, i.e. to operate the wind turbine to capture the maximal power that is available in the wind, with due regard to keeping the wind turbine within operational limits.

While the control system of the wind turbine is designed to take into account the various and varying conditions that a wind turbine operates under, a fault condition may nevertheless arise which requires shutting down the turbine, or alternatively modifying the operation to safe-mode operation. The fault condition may relate to component failure which requires repair or service, or it may relate to conditions which may lead to component failure if the wind turbine is not shut down or operated in safe-mode.

Existing wind turbine shutdown systems are based on measurements of a small subset of the turbine states, such as rotor speed, tower-top acceleration and load measurement to generate a fault signal if the measured value lie outside predefined limits. When shutting down the wind turbine, the fault condition may be taken into account, e.g. by selecting a pre-defined shutdown routine which depends on the nature of the fault. Such shutdown routines are based on the fault scenarios that were taken into account at the design time.

The inventors of the present invention have realized that there is a need for further ways of operating a wind turbine if a fault condition arises during operation of the wind turbine.

SUMMARY OF THE INVENTION

It would be advantageous to control a wind turbine in a manner which takes into account the actual operational state of the wind turbine if a fault condition arises, and which uses the actual operational state in connection with continued operation of the wind turbine either in safe-mode operation or shutdown of the wind turbine.

Accordingly, in a first aspect, there is provided a method of controlling a wind turbine, comprising:
  receiving a current operational state of the wind turbine and based on the current operational state calculate a control trajectory and a safe-mode trajectory, wherein a trajectory comprises a time series of at least one variable; and
  if a fault signal indicating a fault condition of the wind turbine is received, control the wind turbine using the safe-mode trajectory;
  if a fault signal is not received, control the wind turbine using the control trajectory;
  wherein the safe-mode trajectory is calculated using a model predictive control (MPC) routine.

In the present invention, the operation of the turbine is based on a calculated control trajectory. A trajectory is a time series of a variable for a given time slot, which includes the next variable value for the operational parameter related to the variable, as well as a predicted or an expected number of future variable values for the given parameter. For example, the control trajectory may be a pitch trajectory which includes the next pitch command, as well as an expected or a predicted number of future pitch commands.

A wind turbine includes a control system for controlling the various components of the wind turbine, such as the blade pitch setting, the power converter set-points, the yaw motors, etc. Such control system further includes a safe-mode controller with the responsibility of operating the wind turbine in a safe manner. The safe-mode controller may be integrated into the general controller, and may in embodiments refer to the functional units of the general controller which handle the wind turbine during safe-mode operation.

In the present invention, the control system is arranged for receiving a fault condition, and upon receipt of such fault condition ensure that the wind turbine is controlled using a safe-mode trajectory. The safe-mode trajectory being calculated using a model predictive control (MPC) routine.

It is an advantage to calculate the safe-mode trajectory using an MPC algorithm, since MPC algorithms are well suited for taking the current state into account and thereby to calculate an operational trajectory based on the actual state of the wind turbine. MPC algorithms may advantageously be used for safe-mode operation as they directly can take into account constraints on the system variables, and thereby be used to find optimal operational trajectories within safe operational limits.

In an embodiment the safe-mode trajectory is a shutdown trajectory. A shutdown trajectory is a control trajectory which controls the wind turbine from its current state and until the wind turbine is brought to a halt, i.e. is shut down.

In general a safe-mode trajectory is a control trajectory which controls the wind turbine in a safe-manner. A safe-manner is a manner where the wind turbine is operating within safe operational limits. This may be based on the given fault condition and be a control mode which in addition to a shutdown includes control modes with a reduced functionality, a reduced power output, a reduced operational space, etc.

In an embodiment, the safe-mode trajectory is not calculated until the fault signal is received. In this manner the calculated trajectory may in addition to the specific current state, also take the operational faults into account in the calculation of the safe-mode trajectory. This may advantageously be obtained by including the fault condition in the model predictive control routine as one or more constraints and/or by selecting an appropriate cost function based on the type of the fault. In this manner, the MPC routine is dynamically adapting constraints and objective functions to govern turbine behaviour under fault conditions. In a safe-mode situation optimal operational trajectories within safe operational limits may thereby be found.

In an embodiment, only the safe-mode trajectory is calculated using an MPC routine, however advantageously also the control trajectory is calculated using a model predictive control (MPC) routine. In this manner a unified control framework is used for both handling safe-mode control and normal operation control.

Further embodiments are described in connection with the section Description of embodiments.

In further aspects, the invention also relates to a controller for a wind turbine, to a wind turbine park controller which is implemented to control at least selected turbines of the wind turbine park. Moreover, the invention relates to a wind turbine being controlled in accordance with any of the various aspects of the present invention.

In general the various embodiments and aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
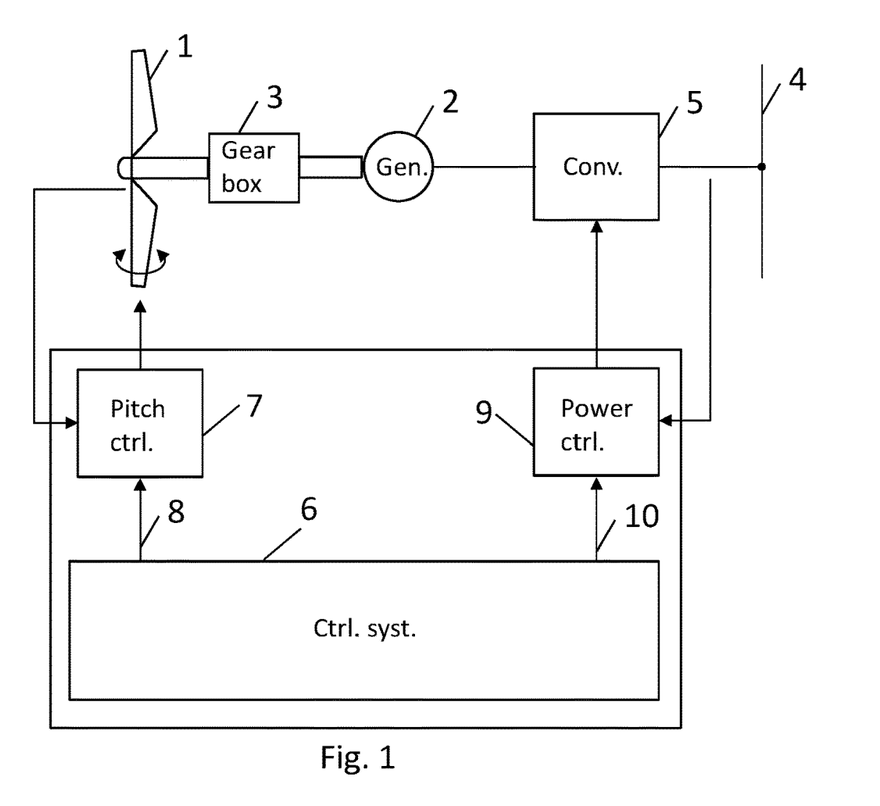
FIG. 1 schematically illustrates an embodiment of a control system together with elements of a wind turbine.

FIG. 1 schematically illustrates an embodiment of a control system together with elements of a wind turbine. The wind turbine comprises rotor blades 1 which are mechanically connected to an electrical generator 2 via gearbox 3. The electrical power generated by the generator 2 is injected into a power grid 4 via an electrical converter 5. The electrical generator 2 can be a doubly fed induction generator, but other generator types may be used.

The control system comprises a number of elements, including at least one controller 6 with a processor and a memory, so that the processor is capable of executing computing tasks based on instructions stored in the memory. In general, the wind turbine controller 6 ensures that in operation the wind turbine generates a requested power output level. This is obtained by adjusting the pitch angle and/or the power extraction of the converter. To this end, the control system 6 comprises a pitch system including a pitch controller 7 using a pitch reference 8, and a power system including a power controller 9 using a power reference 10. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades. In the figure two rotor blades are shown, however any number of rotor blades may be used, in particular three rotor blades.

Figure 2:
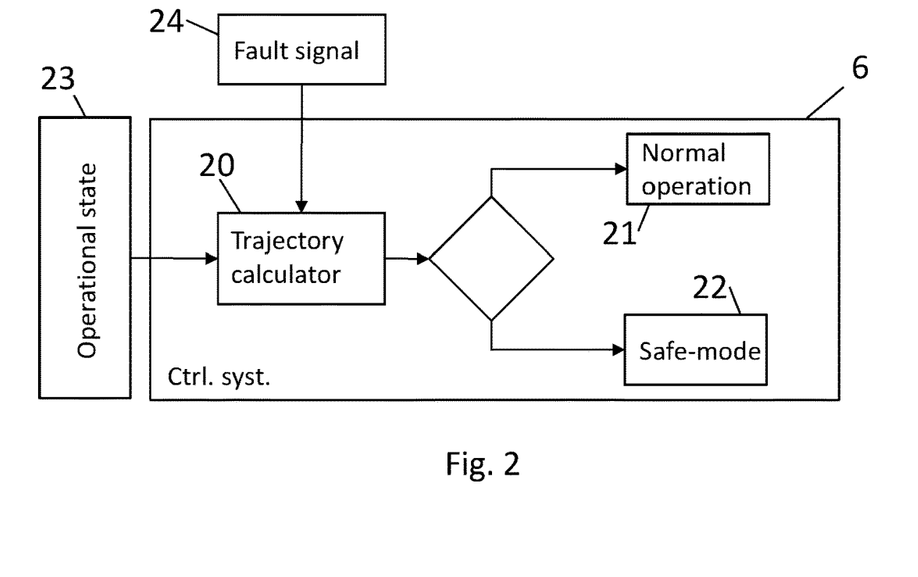
FIG. 2 illustrates aspects of a general embodiment of the present invention in a schematic functional diagram.

FIG. 2 further illustrates elements of the control systems 6 in relation to a trajectory calculator module 20 that receives a current operational state of the wind turbine 23, and based on the operational state calculates a control trajectory for continued normal operation and a safe-mode trajectory. The control system 6 is arranged to control the wind turbine based either the control trajectory or the safe-mode trajectory depending on the state of the wind turbine. That is, if a fault signal indicates a fault condition of the wind turbine, the wind turbine is controlled 22 using the safe-mode trajectory, otherwise, the normal operation 21 of the wind turbine is continued where the wind turbine is controlled using the control trajectory.

In an embodiment, the fault signal is deduced based on the operational state, or it may be provided as a dedicated signal 24, e.g. from sensors or other units which send out fault signals.

In the present invention, the safe-mode trajectory is calculated using a model predictive control (MPC) routine.

Figure 3:
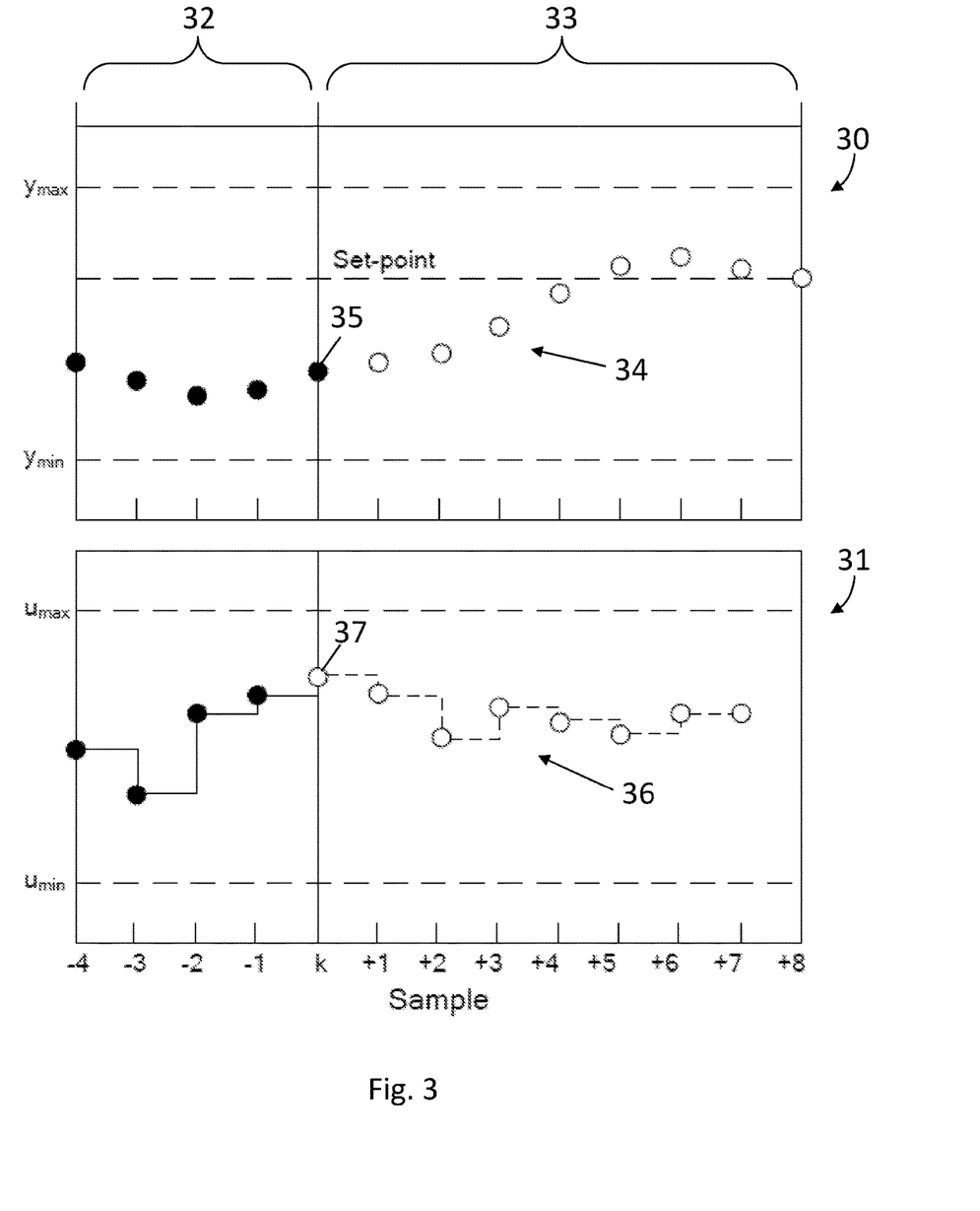
FIG. 3 illustrates an example of a control trajectory determined by use of an MPC algorithm.

FIG. 3 shows general aspects of an MPC routine in relation to a measured operational variable y and an MPC calculated control variable u. The upper part 30 of the figure shows a state trajectory for the variable y and the lower part 31 of the figure shows a control trajectory for the control variable u.

The operational trajectories and control trajectories may include, but are not limited to, one or more of the following parameters: pitch value, including collective pitch values and individual pitch values, rotor speed, rotor acceleration, tower movement, power related parameters, torque related parameters and derivatives of these parameters.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, $\theta$, rotor angular speed, $\omega$, and tower top position, s, as well as time derivatives of those parameters. Other and more parameters may be used to define the wind turbine state, $x^*$.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g. in the form of a dedicated computational unit in charge of determining the current operational state, such as an observer or a Kalman filter.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal. Other and more parameters may be used to define the wind turbine control signal, $u_1^*$.

FIG. 3 shows a trajectory 34 of a measured variable y for a number of discrete time steps. The figure shows the current time, k, as well as a number of past time steps 32 and a number of future time steps 33 (also sometimes referred to as the prediction horizon and the control horizon for the state variable y and the control variable u, respectively). Known variable values, i.e. based on already measured values, are marked with a solid circle, whereas predicted variable values are marked with an open circle. A trajectory may comprise a time series of predicted values, i.e. only the open circles. The trajectory need not include the past and known values, but may do in certain embodiments. In particular, the current value 35 may be included for trajectories of measured variables. The trajectory may span a time series of a few seconds, such as 5-10 seconds. However the trajectory may be longer or shorter depending on the given implementation.

As an example, the trajectory shows the rotor speed ω in a situation where a set-point is given to increase the rotor speed. The trajectory shows the current rotor speed 35 together with the predicted future rotor speeds. Allowed maximum and minimum values are also shown for the illustrated variable.

FIG. 3 further illustrates an example of a general control trajectory 36 determined by use of an MPC algorithm. FIG. 3 illustrates the relationship between an operational state trajectory 34 and a general control trajectory 36. In embodiments, the general control trajectory may be a safe-mode trajectory that is calculated using the predicted operational state trajectory.

While the current k-th value is known for measured variables, the current value 37 of the control trajectory is calculated by use of the MPC routine.

The figure also shows maximum and minimum allowed values for the control trajectory values of u.

As an example, the trajectory shows the trajectory for the pitch angle, i.e. u=θ. Thus a set-point is given to increase the rotor speed, and as a consequence the pitch angle is lowered.

The trajectory shows the next pitch setting 37 together with the predicted future pitch settings to fulfill the new set-point setting.

Model Predictive Control (MPC) is a multivariable control algorithm that uses an optimization cost function J over the receding prediction horizon, to calculate the optimal control moves.

The optimization cost function may be given by:

$$J = \sum_{i=1}^{N} w_{y_i}(r_i - y_i)^2 + w_{u_i}\Delta u_i^2$$

With reference to FIG. 3, $r_i$ is the set-point for the i-th variable, $y_i$ and $u_i$ being i-th trajectory variables, and $w_{d_i}$ being weight matrix defining the relative importance of this variable, and $w_{u_i}$ being weight matrix defining the penalty related to changes in this variable.

By implementing in the controller an MPC routine to calculate the safe-mode trajectory an optimization problem over N time steps (the control and prediction horizon) is solved. The result is an optimal input sequence for the entire horizon which may be used for controlling the turbine during safe-mode.

In an embodiment shutdown trajectories are calculated by solving dynamic optimization problems online in the form of online computation of safe-mode trajectories by using model predictive control (MPC). Typically, the optimization problem solved in such applications is formulated in terms of an objective function (a cost function) and a number of constraints (e.g., max/min limits, rate-of-change limits, etc.). When applying such a control scheme for normal operation, the objective function is typically formulated to provide a trade-off between loads and power production, and with certain operating parameters such as rotor speed, pitch position and speed, and generator torque being governed by constraints.

In embodiments of the present invention faults are dealt with by applying a cost function and constraints that reflect the current capability of the faulty system, such as sudden loss of generator torque, loss of grid connection, or full or partly loss of pitch capability.

In an embodiment, upon receipt of the fault signal, the safe-mode trajectory is calculated using the MPC routine. In this manner, the nature of the fault is taken into account when determining the safe-mode trajectory. The fault condition may be included in the model predictive control routine as a constraint, and the cost function of the model predictive control routine is based on a type of the fault.

In an example embodiment, the optimization problem used for normal production has the form:

$$u^*(t) = \text{argmin } J_0(S(t), P(t), u(t)),$$

subject to the constraints:

$$\omega_R \leq \Gamma_{\omega_R}$$

$$-5 \leq \theta_i \leq 90, i \in \{1,2,3\}$$

$$-20 \leq \dot{\theta}_i \leq 20, i \in \{1,2,3\}$$

$$P_E \leq 3 \text{ MW}$$

The function argmin is the standard mathematical operator which stands for argument of the minimum, and finds points in the parameter space spanned by S, P, u and t where the cost function $J_0$ attains its smallest value. The parameter $\Gamma_{\omega_R}$ denotes the rated rotor speed, $\theta_i$ the pitch angle (with derivative) and $P_E$ refers to the rated power of the turbine.

Here, the nominal cost function $J_0$ provides a trade-off between power (P) and loads (S) using the control signal u(t), while the constraints limit the rotor speed, blade pitch angle, blade pitch speed, and electrical power. The control signal would typically consist of blade pitch angles and power reference for the converter:

$$u(t) = \begin{bmatrix} \theta_1(t) \\ \theta_2(t) \\ \theta_3(t) \\ P_{ref}(t) \end{bmatrix}$$

Figure 4:
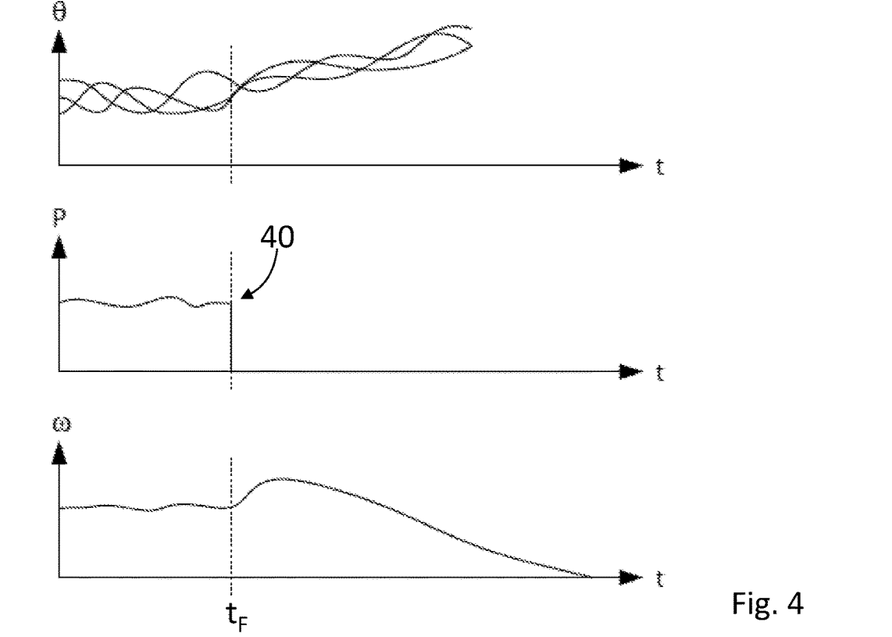
FIGS. 4 to 7 illustrate examples of safe-mode trajectories in different fault condition scenarios.

FIG. 4 illustrates example trajectories in a situation where a converter failure occurs 40, effectively preventing any power production after the time $t=t_F$. In such a case, a possible change in the cost function and the constraints could be:

$$u^*(t) = \text{argmin } J_1(S(t), u(t)),$$

subject to the constraints:

$$\omega_R \leq \Gamma_{\omega_R}$$

$$-5 \leq \theta_i \leq 90, i \in \{1,2,3\}$$

$$-20 \leq \dot{\theta}_i \leq 20, i \in \{1,2,3\}$$

$$P_E = 0$$

In this manner, the power production is no longer part of the cost function, and it is constrained to zero, as power generation is no longer possible. When power production capability is lost, the rotor speed exhibits a small overshoot but is brought to standstill by the pitch action which continues its individual pitch action while pitching out towards stop.

In practice, this would effectively disallow the converter-governed generator torque to be used as means for controlling the turbine, leaving the turbine to be controlled by pitching the blades. Other designs may include the ability to apply electrical or mechanical brakes. In such case, the control signal may include a Boolean activation signal for the brake.

Figure 5:
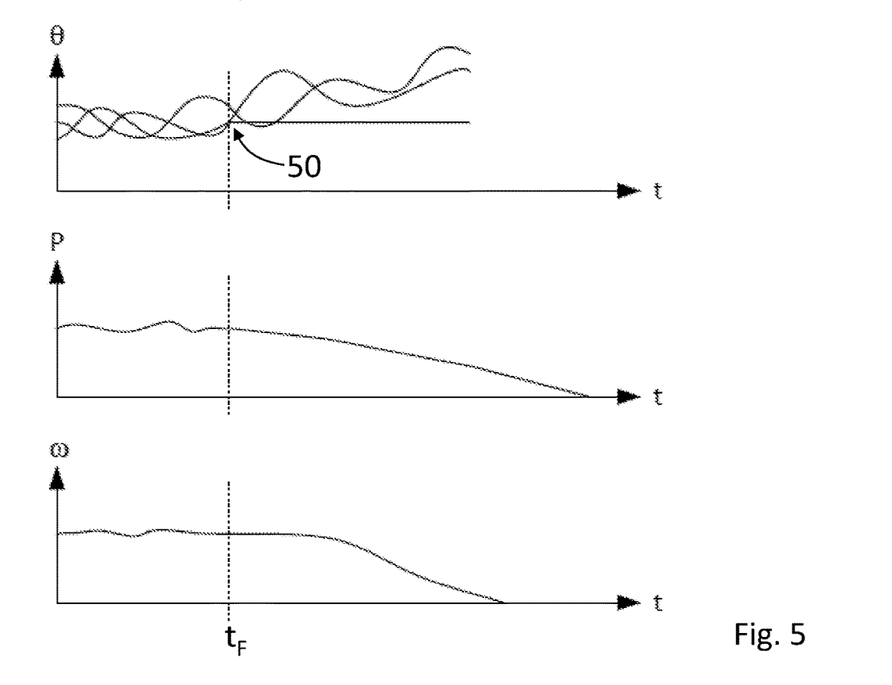

FIG. 5 illustrates example trajectories in a situation where a failure 50 relating to reduced ability to pitch the blades occur at $t=t_F$, e.g. with one blade mechanically stuck at, say, 10 degrees. In such a case, it may be possible to continue operating the turbine in a reduced mode. When one blade is stuck, the other two blades' individual pitch activity increases to compensate for the stuck blade. At the same time they pitch out to stop the rotational motion. The electrical power is retained to help braking the rotor.

For an optimization based scheme, this operating mode may be accommodated by a modification of the problem, with the blade pitch speed for one blade being constrained to 0 degrees/s:

$$u^*(t) = \operatorname{argmin} J_0(S(t), P(t), u(t)),$$

subject to the constraints:

$$\omega_R \leq \Gamma_{\omega_R}$$

$$-5 \leq \theta_i \leq 90, i \in \{1,2\}$$

$$-20 \leq \dot{\theta}_i \leq 20, i \in \{1,2\}$$

$$\dot{\theta}_3 = 0$$

$$P_E \leq 3 \text{ MW}$$

Figure 6:
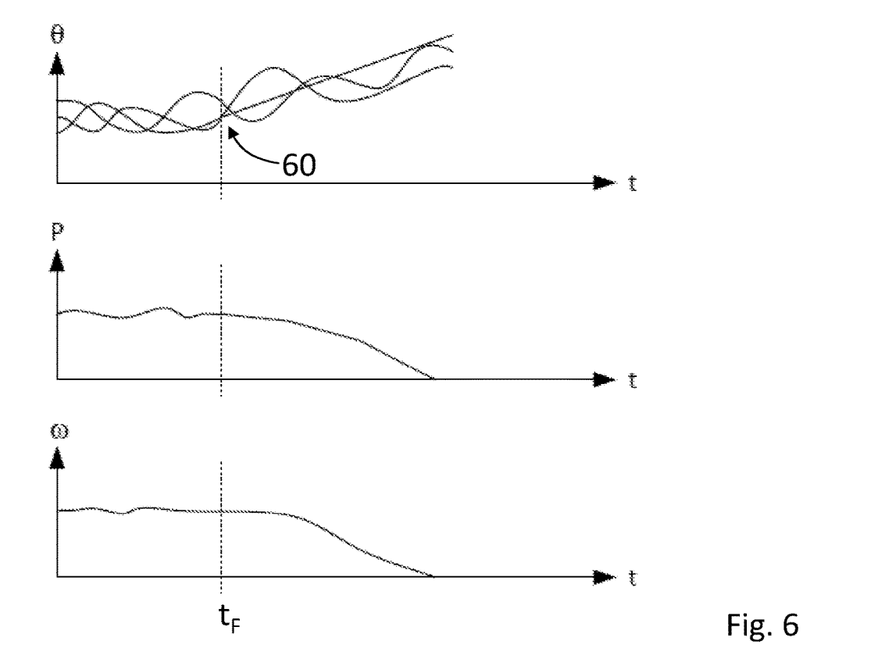

FIG. 6 illustrates example trajectories in another situation where a failure 60 relating to reduced ability to pitch the blades occur at $t=t_F$. In this example, the blade pitch hydraulics for blade 3 is only capable of providing a constant pitch rate for this blade. The other two blades' individual pitch activity increases to compensate for third blade not contributing to individual pitch control. The rotor is brought to a standstill slightly faster than for example 2, as the faulty blade is not stuck but pitches:

$$u^*(t) = \operatorname{argmin} J_0(S(t), P(t), u(t)),$$

subject to the constraints:

$$\omega_R \leq \Gamma_{\omega_R}$$

$$-5 \leq \theta_i \leq 90, i \in \{1,2\}$$

$$-20 \leq \dot{\theta}_i \leq 20, i \in \{1,2\}$$

$$\dot{\theta}_3 = 5$$

$$P_E \leq 3 \text{ MW}$$

Figure 7:
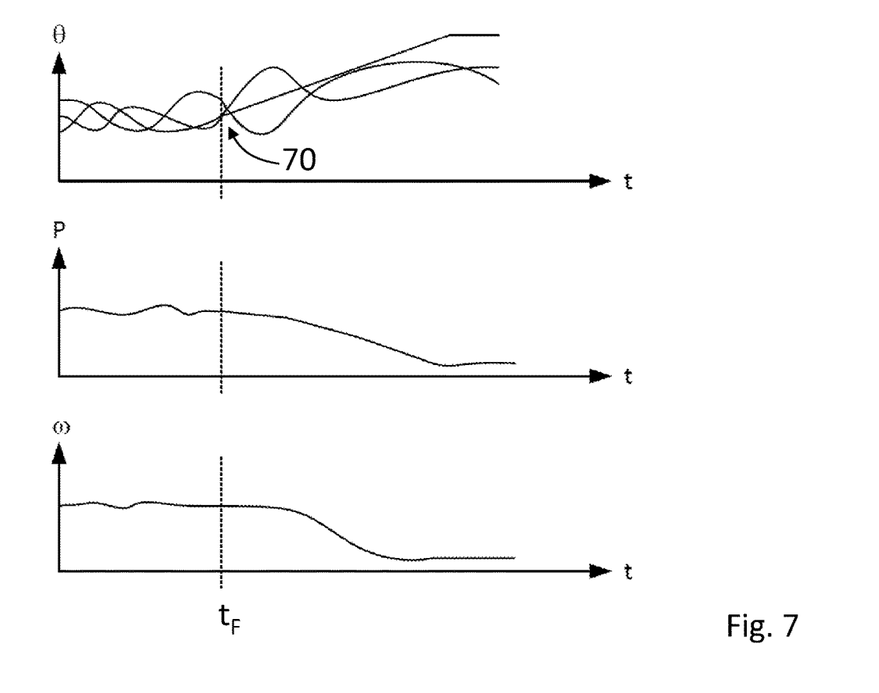

FIG. 7 illustrates example trajectories in a situation where a failure results in continued operation in a safe-mode where the turbine keeps on operating, but at a lower power production.

In this example, the turbine is equipped with the ability to individually pitch the blades, but at $t=t_F$, an error 70 occurs resulting in one blade that falls back to a safe state with a constant pitch rate. The other two blades' individual pitch activity increase to compensate for the third blade not contributing to individual pitch control. The two non-faulty blades are brought to pitch angles that will not bring the rotor to a standstill, but leave the rotor spinning at a low rate, thus allowing a modest power production despite the faulty blade.

In embodiments where both the control trajectory and the safe-mode trajectory are calculated using a model predictive control (MPC) routine, the cost function and the constraints may be changed upon detection of a given fault scenario (i.e. upon receipt of the fault signal), but otherwise use the same MPC routine. In such an embodiment only one optimal control signal is to be computed at every sample instant.

In an embodiment, safe-mode trajectories are continuously calculated during operation of the wind turbine. In such an embodiment possible fault scenarios are evaluated at each time step. That is, a "what-if?"-type of scheme is used, where control signal trajectories for possible future fault scenarios are continuously prepared. Two or more complete safe-mode trajectories may be calculated based on the operational state of the wind turbine, and a given complete safe-mode trajectory may be selected based on the fault signal. The selection may be based on a selection routine implemented by the control system. Such a selection routine may implement selection criteria allowing it to select the most appropriate safe-mode trajectory among the available trajectories.

In an embodiment where the safe-mode trajectory is a shutdown trajectory, the time series of the shutdown trajectory may or may not span the entire shutdown process. If the time series of the shutdown trajectory span the entire shutdown process, i.e. if a complete shutdown trajectory is calculated prior to the initiation of the shutdown the wind turbine may be controlled using the complete shutdown trajectory. This has the advantage that the pre-determined control trajectory can be executed, even if the mechanism for solving the optimization problem fails.

In another embodiment advantage may be taken of the MPC routine being a receding horizon routine, so that during shutdown the shutdown trajectory is repeatedly calculated as a receding horizon trajectory, and wherein wind turbine is controlled using the last calculated shutdown trajectory. In such an embodiment, at time t the current state is sampled and a cost-minimizing control strategy is computed for a time horizon in the future: [t, t+T]. Only the first predicted value for the current sample k is used in the shutdown control signal, then the turbine state is sampled again and the calculations are repeated starting from the new current state, yielding a new shutdown trajectory and new predicted state trajectory. In this manner it is ensured that an optimal trajectory is used during the entire shutdown process.

In another embodiment the shutdown process is a two-step process. In the first step the safe-mode trajectory is calculated to bring the turbine to a safe region from where a safe shutdown trajectory is known. In a second step a safe shutdown trajectory is used to bring the turbine to a full stop. The second part of the safe shutdown trajectory may be pre-calculated, or the safe region may be an operational state from which shutdown is trivial.

In an embodiment, the shutdown trajectory may be calculated using a reduced system model where the MPC routine uses a subset of the operational state of the wind turbine to calculate the safe-mode trajectory. The calculation of the trajectories using a reduced model may in many ways be similar to a full scale calculation, however the computational resources needed to implement it in the wind turbine controller is less than for a full scale MPC controller.

In an embodiment, the wind turbine controller is arranged to implement at least one validation routine capable of validate the control trajectory for a future time slot to determine whether or not the control trajectory is valid or invalid, and generate a fault signal if the control trajectory is not valid. By validating the operational trajectory, the control system can establish whether or not the system can operate in a safe manner, not just for the current time, but for at least a part of the future time slot included in the operational trajectory. In this manner, the control system can prepare for a problematic situation before it actually happens. That is, the controller can in a timely manner enter into safe-mode operation, instead of only reacting on a problematic situation once it has been detected.

Being able to react to problematic operational states before they have actually occurred, or have developed to a problematic state, leads to improved turbine protection. Additionally, it may bring about the further advantages that the downtime due to safe-mode operation, including shutdown, may be reduced since errors are either found before they occur or at least in an early stage. This may further lead to reduced repair costs. Further the cost may be reduced for load-bearing elements as mechanical load requirements can be reduced. In embodiments of the present invention such equipment can for many error scenarios be specified for controlled shutdown operation rather than for emergency shutdown.

In addition to validating the control trajectory, or as an alternative to validating the control trajectory, also the safe-mode trajectory may be validated for a future time slot, to determine whether or not the safe-mode trajectory is valid or invalid, and control the wind turbine to shutdown using a predetermined shutdown trajectory if the safe-mode trajectory is not valid.

The predetermined shutdown trajectory may be stored in a memory of the controller. The memory may store one or more pre-programmed shutdown control trajectories, such as appropriate control trajectories which are known to operate the wind turbine within load limits. Alternatively or additionally, the controller may also store the last valid one, or a number of pre-validated shutdown control trajectories to choose from. The actual trajectories that are stored in the memory may constantly be updated with the latest calculated ones.

In an embodiment the MPC optimization may also be performed with the additional constraint that a control trajectory in the future time slot may not comprise an operational state from which a solution to the MPC calculation of the safe-mode trajectory cannot be found. That is, for any future point in the control trajectory, for a selected or predefined fault condition, a solution to such fault scenarios can be found. Turbine operation is thus constrained to a region of operating conditions from which shutdown trajectories exist in case of potential faults. In this manner a recursive feasibility of the control trajectory can be made where it is ensured that the wind turbine is never brought to a state from which it cannot find a safe shutdown trajectory, subject to any of the given faults. Thus, it is ensured that feasible shutdown solutions exist from any state along the predicted control trajectory.

The validation may further include a validation of the predicted operational state trajectory for a future time slot. If the operational trajectory is invalid, a fault signal is generated.

In an embodiment, the validation routine compares one or more parameter values of the one or more operational trajectories to predefined constraint values of such parameters, and wherein the validation routine is valid if the one or more compared parameters do not exceed the constraint values. Thus, the validation routine simply checks one or more predicted trajectories to make sure that the predicted trajectory values stay within appropriate limits for the predicted time period. Examples include checking that the predicted pitch trajectories stay within allowed pitch values and that the predicted tower top movement stays within allowed values. Generally, trajectories for safety critical parameters can be selected and validated to be within allowed constraint limits. Further and other validation routines may be used.

In embodiments, the control system may be split into two subsystems, a main controller subsystem and a safety controller subsystem. This division may be physically or logically in any appropriate way.

The control system may be based on generic or standard industrial computing equipment, whereas the safety system may be based on safety certified computing equipment, as well as rigorously tested software. Typically, the safety-related part of the control system may be constructed according to the principles given in recognized standards for functional safety. Such standards encompass e.g. ISO 13849, IEC 61508, and IEC 62061. Besides from fulfilling specific, quantitative requirements to reliability and diagnostic coverage, systems constructed according to these standards are guaranteed to be free of systematic failures such as software defects. The control system may thus be split into a normal control domain which perform the calculating tasks using standard computing equipment, and a safety control domain which performs the calculating tasks using safety-related computing equipment.

In an embodiment, the model predictive control (MPC) routine is implemented in a normal control domain of the wind turbine's controller so that the safe-mode trajectory is calculated in the normal control domain. This may be done to reduce the cost of the control system since real-time calculation of predicted trajectories for an operating wind turbine is quite computational demanding.

To increase the safety level, a validation routine may be implemented in the safety domain of the wind turbine's controller. The purpose of the validation routine is to validate the safe-mode trajectory.

In this way computational heavy calculation tasks may be placed in the normal operational domain of the control system, while the task of the safety controller is to validate the result of the main controller. Validating the result of a complex calculation, involving e.g. numerical optimization, may be done in a much less computational demanding manner than performing the complex calculation itself. Consequently the validation can be placed in the safety-related domain of the control system. The resulting safety level may be as high as if the actual calculation was performed in the safety domain.

Nevertheless, if the computational resources of the safety system permit it, the model predictive control (MPC) routine may be implemented in the safety domain of the wind turbine's controller, in order to calculate the safe-mode trajectory in the safety domain. It may be a requirement that there is a high safety level assigned to the safe-mode trajectory, a trajectory calculated in the safety controller can be used without further validation.

In further embodiments, the general aspects of the embodiments of the present invention may be implemented in a wind turbine park controller arranged for controlling one or more wind turbines of a wind turbine park. In such embodiment, the wind park controller may control one or more selected wind turbines. In such embodiment, the wind turbine controller may be implemented in a distributed manner, where parts of the controller are implemented in the wind turbine whereas other parts of the controller are implemented in the wind park controller.

Figure 8:
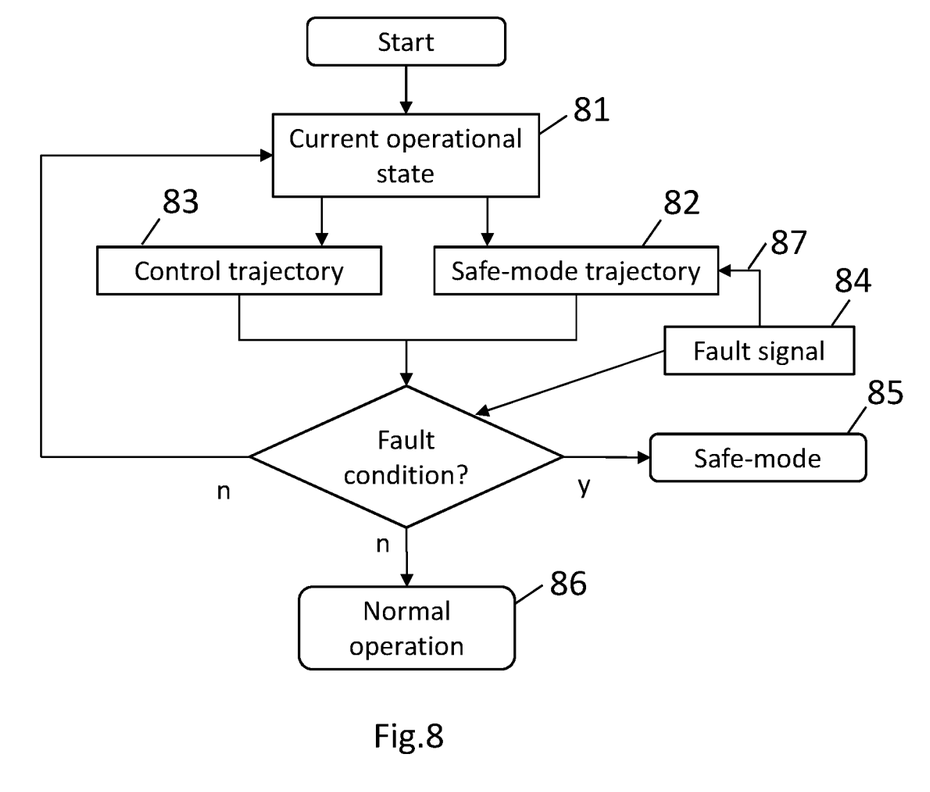
FIG. 8 illustrates a flow chart of elements of embodiments of the present invention.

FIG. 8 illustrates a flow chart of elements of embodiments of the present invention.

In a first step 81, the current operational state of the wind turbine is determined or received, and based on the current operational state a control trajectory and a safe-mode trajectory are calculated in step 82, 83. Both trajectories may be calculated using a model predictive control (MPC) routine, however, at least the safe-mode trajectory is calculated by a MPC routine.

A fault signal 84 indicating whether or not a fault condition is present is received or accessed. If the fault signal indicates a fault condition of the wind turbine, the wind turbine is controlled using the safe-mode trajectory 85, whereas if the fault signal is either not received or does not indicate a fault condition, the wind turbine is controlled for normal mode operation using the control trajectory 86. The safe-mode trajectory may be calculated based on the actual fault condition 87.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of controlling a wind turbine, comprising:
receiving a current operational state of the wind turbine;
calculating, based on the current operational state, a control trajectory comprising a time series of at least one variable;
generating, in the absence of a fault signal indicating a fault condition of the wind turbine, one or more control signals according to the control trajectory; and
responsive to receiving the fault signal:
determining a type of the fault condition indicated by the fault signal;
determining, based on the type of the fault condition, a cost function of a model predictive control (MPC) routine;
calculating, using the MPC routine, a safe-mode trajectory comprising a time series of at least one variable; and
generating one or more control signals according to the safe-mode trajectory,
wherein the time series of the safe-mode trajectory spans an entirety of a two-step shutdown process of the wind turbine,
wherein in a first step of the shutdown process, the safe-mode trajectory is calculated to bring the wind turbine to a safe region from where a safe shutdown trajectory is known, and
wherein in a second step of the shutdown process, a pre-defined safe shutdown trajectory is used for bringing the wind turbine to a full stop.

2. The method according to claim 1, wherein during safe-mode operation, the safe-mode trajectory is repeatedly calculated as a receding horizon trajectory, and
wherein generating one or more control signals according to the safe-mode trajectory comprises generating the one or more control signals using a last-calculated safe-mode trajectory.

3. The method according to claim 1, wherein the safe-mode trajectory is continuously calculated during operation of the wind turbine.

4. The method according to claim 1, wherein the fault condition is included in the MPC routine as one or more constraints.

5. The method according to claim 1, further comprising calculating a predicted operational state trajectory, and wherein the safe-mode trajectory is calculated using the predicted operational state trajectory.

6. The method according to claim 1, wherein receiving the current operational state of the wind turbine comprises:
acquiring sensor data relating to a physical state of the wind turbine.

7. The method according to claim 1, wherein the MPC routine is based on a reduced model based on a subset of the current operational state of the wind turbine.

8. The method according to claim 1, further comprising:
performing at least one validation routine to determine whether the control trajectory is valid for a future time slot, and
generating the fault signal responsive to determining that the control trajectory is not valid.

9. The method according to claim 1, further comprising:
performing at least one validation routine to determine whether the safe-mode trajectory is valid for a future time slot, and
generating one or more control signals using a predetermined shutdown trajectory responsive to determining that the safe-mode trajectory is not valid.

10. The method according to claim 5, further comprising:
performing at least one validation routine to determine whether the predicted operational state trajectory is valid for a future time slot, and
generating the fault signal responsive to determining that the predicted operational state trajectory is not valid.

11. The method according to claim 1, further comprising:
determining whether a future time slot of the control trajectory comprises an operational state from which a solution to calculating the safe-mode trajectory cannot be found.

12. The method according to claim 1, wherein the MPC routine is implemented in a normal control domain of a controller of the wind turbine, and wherein the safe-mode trajectory is calculated in the normal control domain.

13. The method according to claim 12, wherein the controller further comprises a safety domain, the method further comprising:
performing a validation routine implemented in the safety domain to validate the safe-mode trajectory.

14. The method according to claim 1, wherein the MPC routine is implemented in a safety domain of a controller of the wind turbine, and wherein the safe-mode trajectory is calculated in the safety domain.

15. The method according to claim 1, wherein the control trajectory is calculated using a model predictive control (MPC) routine.

16. A control system for a wind turbine, comprising:
a controller configured to:
determine a current operational state of the wind turbine;
calculate, based on the current operational state, a control trajectory comprising a time series of at least one variable;
generate, in the absence of a fault signal indicating a fault condition of the wind turbine, one or more control signals according to the control trajectory; and
responsive to receiving the fault signal:
determining a type of the fault condition indicated by the fault signal;
determining, based on the type of the fault condition, a cost function of a model predictive control (MPC) routine;

calculating, using the MPC routine, a safe-mode trajectory comprising a time series of at least one variable; and generating one or more control signals according to the safe-mode trajectory, wherein the time series of the safe-mode trajectory spans an entirety of a two-step shutdown process of the wind turbine, wherein in a first step of the shutdown process, the safe-mode trajectory is calculated to bring the wind turbine to a safe region from where a safe shutdown trajectory is known, and wherein in a second step of the shutdown process, a pre-defined safe shutdown trajectory is used for bringing the wind turbine to a full stop.

17. A wind turbine park controller arranged for controlling one or more wind turbines of a wind turbine park, the wind turbine park controller comprising:

a controller configured to:
determine a current operational state of a selected wind turbine of the one or more wind turbines;

calculate, based on the current operational state, a control trajectory comprising a time series of at least one variable;

generate, in the absence of a fault signal indicating a fault condition of the selected wind turbine, one or more control signals for the selected wind turbine according to the control trajectory; and responsive to receiving the fault signal:
determining a type of the fault condition indicated by the fault signal;

determining, based on the type of the fault condition, a cost function of a model predictive control (MPC) routine;

calculating, using the MPC routine, a safe-mode trajectory comprising a time series of at least one variable; and generating one or more control signals for the selected wind turbine according to the safe-mode trajectory;

wherein the time series of the safe-mode trajectory spans an entirety of a two-step shutdown process of the wind turbine, wherein in a first step of the shutdown process, the safe-mode trajectory is calculated to bring the wind turbine to a safe region from where a safe shutdown trajectory is known, and wherein in a second step of the shutdown process, a pre-defined safe shutdown trajectory is used for bringing the wind turbine to a full stop.

18. A wind turbine comprising a control system adapted to perform the method according to claim 1.

* * * * *